(12) United States Patent
Kang

(10) Patent No.: US 8,444,488 B2
(45) Date of Patent: May 21, 2013

(54) DEVICE AND METHOD FOR CONTROLLING THE MOVEMENT OF A GAME CHARACTER

(75) Inventor: Hyungsuk Kang, Kuri-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 13/388,984

(22) PCT Filed: Jul. 26, 2010

(86) PCT No.: PCT/KR2010/004887
§ 371 (c)(1),
(2), (4) Date: Feb. 20, 2012

(87) PCT Pub. No.: WO2011/016639
PCT Pub. Date: Feb. 10, 2011

(65) Prior Publication Data
US 2012/0190451 A1    Jul. 26, 2012

(30) Foreign Application Priority Data
Aug. 5, 2009    (KR) .................... 10-2009-0072077

(51) Int. Cl.
*A63F 13/06* (2006.01)
(52) U.S. Cl.
USPC ........................................................ 463/37
(58) Field of Classification Search
USPC ............. 463/31, 36–42; 700/91–93; 345/474, 345/643, 681–688
See application file for complete search history.

(56) References Cited

U.S. PATENT DOCUMENTS

| | | | |
|---|---|---|---|
| 5,704,837 A * | 1/1998 | Iwasaki et al. .................. 463/38 |
| 6,375,572 B1 * | 4/2002 | Masuyama et al. ............. 463/43 |
| 6,500,069 B1 * | 12/2002 | Ohba et al. ...................... 463/31 |
| 6,949,024 B2 * | 9/2005 | Kaku et al. ...................... 463/31 |
| 7,104,890 B2 * | 9/2006 | Tsuda et al. ..................... 463/30 |
| 7,147,560 B2 * | 12/2006 | Zimmerman .................... 463/25 |
| 7,601,066 B1 * | 10/2009 | Masuyama et al. ............. 463/38 |
| 7,637,813 B2 * | 12/2009 | Katayama et al. .............. 463/31 |
| 7,648,415 B2 * | 1/2010 | Izuno et al. ...................... 463/31 |
| 7,872,638 B2 * | 1/2011 | Sato ............................... 345/164 |
| 8,012,006 B2 * | 9/2011 | Koganezawa et al. ............ 463/7 |
| 8,020,029 B2 * | 9/2011 | Aggarwal et al. ................. 714/2 |
| 8,172,678 B2 * | 5/2012 | Kaku et al. ...................... 463/31 |
| 8,226,481 B2 * | 7/2012 | Shimamura et al. ............ 463/37 |
| 8,231,468 B2 * | 7/2012 | Kouno ............................ 463/36 |
| 8,303,412 B2 * | 11/2012 | Okamura ........................ 463/37 |
| 8,308,565 B2 * | 11/2012 | Nakanishi et al. .............. 463/37 |
| 2007/0213110 A1 * | 9/2007 | Rosenberg ......................... 463/7 |
| 2008/0293464 A1 * | 11/2008 | Cheng et al. ...................... 463/3 |
| 2010/0099494 A1 * | 4/2010 | Dohta et al. .................... 463/38 |

FOREIGN PATENT DOCUMENTS

JP    2000-024312 A    1/2000
JP    2003-038851 A    2/2003

* cited by examiner

*Primary Examiner* — Dmitry Suhol
*Assistant Examiner* — Jason Skaarup
(74) *Attorney, Agent, or Firm* — Patent Office of Dr. Chung Park

(57) ABSTRACT

The present invention relates to a device and method for controlling the movement of a games character, which enable character movement of a type in which a character in the game jumps down and falls freely from an elevated height following an action by the games player, or progresses forwards in the direction of movement if another action is performed. The present invention has the advantageous effect that the appeal of a game is maximized as the movement time and the movement distance differ depending on the terrain and updrafts in the game even though the degree of freedom for actions is small.

20 Claims, 4 Drawing Sheets

DEVICE AND METHOD FOR CONTROLLING THE MOVEMENT OF A GAME CHARACTER

CROSS-REFERENCE TO PRIOR APPLICATIONS

This application is a national Stage Patent Application of PCT International Patent Application No. PCT/KR2010/004887, filed on Jul. 26, 2010 under 35 U.S.C. §371, which claims priority of a Korean Patent Application No. 10-2009-0072077, filed on Aug. 5, 2009, which are all hereby incorporated by reference in their entirety.

BACKGROUND OF THE INVENTION

1. Technical Field

The present invention relates to a manipulation method of game that is executed on personal computer or game console platform, more particularly, to a manipulation method that helps user to control his character's movement in the game.

2. Description of the Prior Art

User can play most of games by control his character's motion which is shown on screen regardless of genre or platform, except for several games with first person point of view.

Regarding to prior art, a character can move in various patterns. It can walk from one side to another side, run, tumble down from an elevated height, or fly in game.

User can manipulate his character's movement by pressing proper keys or buttons of input apparatus such as keyboard or joystick. The character's movement can be shown on screen as an animation according to the user's manipulation.

However, manipulation of character's movement will not make any pleasure to user when the character can move freely with fluent degree of freedom of movement. It is because the character's movement does not belong to contents itself or objects of the game.

In the meantime, degree of freedom of controlling the character's movement will be quite restricted in certain situation that the character opens glider and flies forward after jumping from an elevated height and falling freely in game because user cannot control anything but the direction of movement and the altitude the character jumps. However, the character's movement can make pleasure by making the distance the character flies as one of the contents of the game.

This kind of movement of character cannot be executed just by incrementing or decrementing the character's coordinate value. Free fall should be implemented just as real world, the laws of physics for reproducing glider's movement should be considered in order to implement the above mentioned movement of character in game. Moreover, dramatic interpretation can be added to enhance pleasure of the game within the laws of physics.

The present invention has been made to overcome the above-mentioned problems. It is the object of the present invention to provide an apparatus and method of that enables movement of game character such that the character opens glider and flies forward after jumping from an elevated height and falling freely in game.

SUMMARY OF THE INVENTION

In one embodiment of the present disclosure, an apparatus for controlling a game character's movement includes: an input means for receiving an input from a user; a coordinate calculation means for calculating a coordinate of a character in a coordinate system of a game as time progresses; and a display control means for showing the character on a screen by using the coordinate of the character in the game, wherein the coordinate calculation means increases an absolute value of a movement velocity of the character in Y axis in proportion to a value obtained by multiplying a time increment after a fall command is inputted by an acceleration coefficient when the fall command is inputted by the user, and wherein the coordinate calculation means increases an absolute value of a movement velocity of the character in X axis in proportion to a value obtained by multiplying a time increment after a gliding command is inputted by the absolute value of the movement velocity of the character in Y axis, and decreases the absolute value of the movement velocity of the character in Y axis after the gliding command is inputted and before the character's landing in the coordinate system of the game.

In another embodiment of the present disclosure, a method of controlling a movement of a game character in a computer includes: (a) increasing an absolute value of a movement velocity of a character in Y axis in proportion to a value obtained by multiplying a time increment after a fall command is inputted by an acceleration coefficient when a fall command is inputted by a user, then calculating the coordinate of the character in a game and showing the movement of the character on a screen; and (b) increasing an absolute value of a movement velocity of the character in X axis in proportion to a value obtained by multiplying a time increment after a gliding command is inputted by the absolute value of movement velocity of the character in Y axis, and decreasing the absolute value of movement velocity of the character in Y axis after the gliding command is inputted and before the character's landing in the coordinate system of the game, then calculating the coordinate of the character in the game and showing the movement of the character on the screen.

Advantageous Effect

According to the present invention, user can control game character's movement with restricted condition of direction and velocity of the movement.

Moreover, user can control game character's movement easily by a simple input such as pressing space bar once and again. Pleasure of game can be enhanced because the velocity and the distance the character flies varies according to the terrain of game map or random ascending air current in spite of simplified control method.

DETAILED DESCRIPTION OF THE INVENTION

Hereinafter, the configuration of the apparatus of controlling game character's movement according to the present invention will be described with reference to the accompanying drawings.

Figure 1:
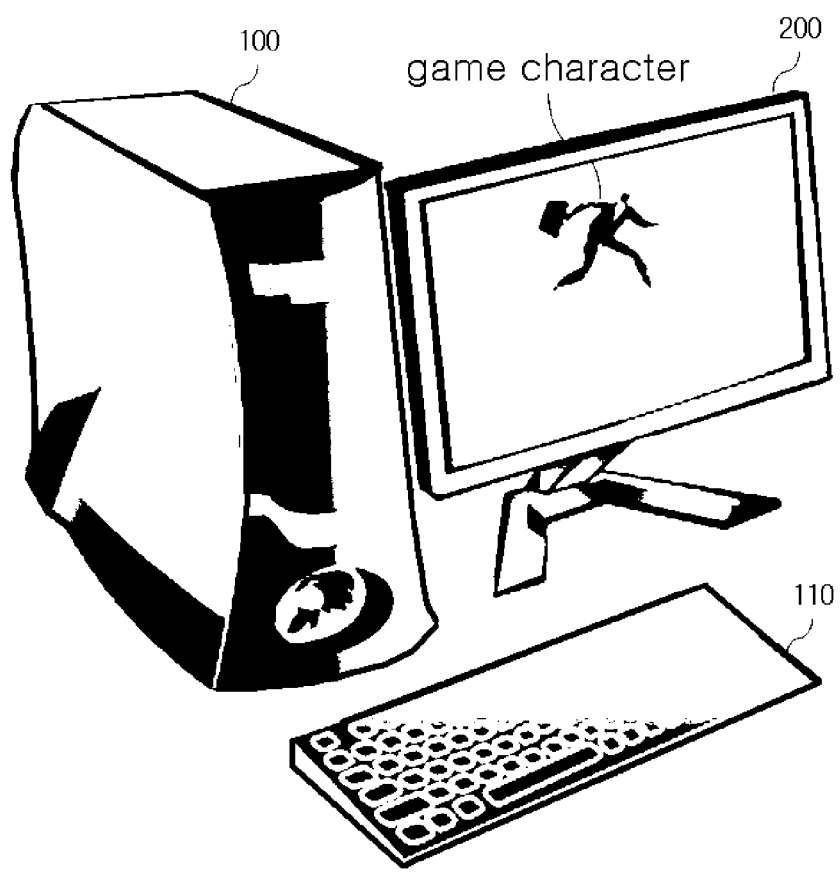
FIG. 1 shows the apparatus of controlling game character's movement according to the present invention.
Figure 2:
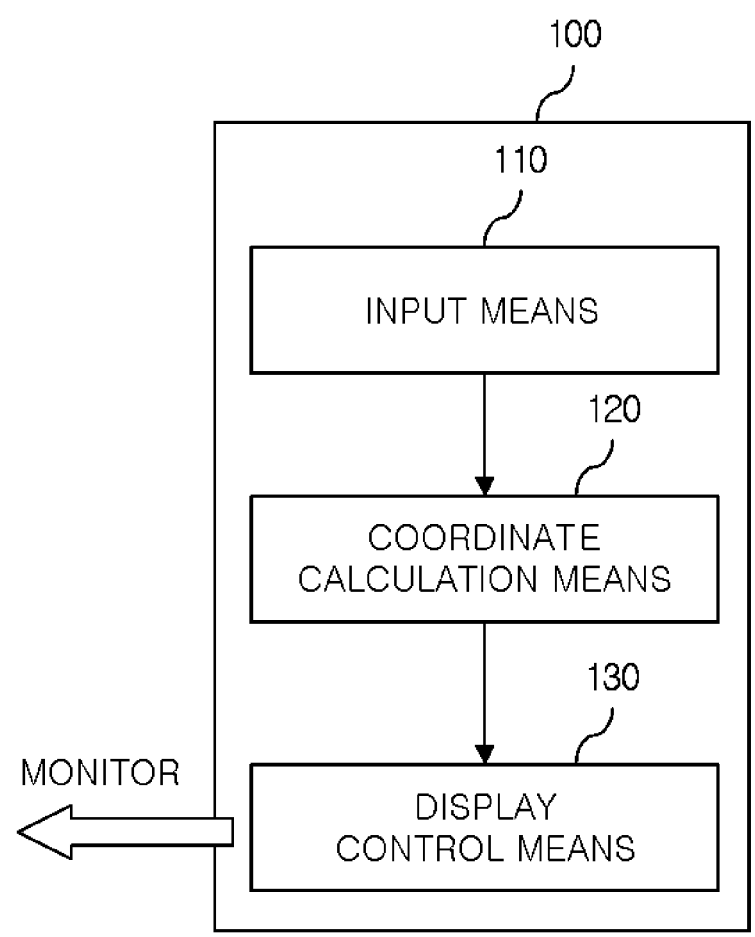
FIG. 2 illustrates function block diagram of the apparatus of controlling game character's movement according to the present invention.

FIG. 1 shows the apparatus of controlling game character's movement according to the present invention, and FIG. 2 illustrates function block diagram of the apparatus of controlling game character's movement according to the present invention.

The apparatus of controlling game character's movement according to the present invention 100 receives input from input means 110 and shows result of the input on monitor 200, and can be implemented on a computer as illustrated in FIG. 1.

Computer means an apparatus that processes inputted instruction words in digital way and outputs the result on output means in a broad sense. It also means a platform for game software. Therefore, the word "computer" includes personal computer illustrated in FIG. 1 and much more devices such as PDA or Laptop, etc.

The input means 110 is illustrated as a keyboard in FIG. 1, however the input means 110 can be various device such as joystick that are commonly used in game play.

The apparatus of controlling game character's movement according to the present invention 100 comprises an input means 110 for receiving input from user, a coordinate calculation means 120 for calculating character's coordinate and a display control means 130 for display game character with calculated coordinate on monitor 200 as illustrated in FIG. 2.

Usually, user can play game by moving his character in 2-dimensional or 3-dimensional coordinate system regardless of game genre from classic arcade games with vertical or horizontal scroll system to popular MMORPGs (Massive Multiplayer Online Role Playing Game).

Coordinate calculation means 120 calculates coordinate of game character in coordinate system of the game. It repeatedly calculates coordinate of the game character that changes when user inputs with input means 110 in order to move his game character in game.

For example, coordinate calculation means 120 calculates coordinate of game character according to inputted "→" key when user inputs "→" key with keyboard so the character can move to the direction corresponds to "→" key.

Display control means 130 shows the character on monitor 200 with the calculated coordinate values when the character's coordinate is calculated. Coordinate calculation means 120 renew the character's coordinate in the event of key input or game process. Display control means 130 animates the character on monitor 200 with renewed coordinate.

Coordinate system provides scheme for representing relative location of objects including character in game. X coordinate and Y coordinate can be used to represent location of objects. Also, Z coordinate can be used in games with 3-dimensional graphic or 3 dimensional coordinate system.

A character may have X coordinate and Y coordinate in a game illustrated in FIG. 1. Y coordinate may increase while the character moves to upper direction of monitor 200 and X coordinate may increase while the character moves to right. If the character stand on the ground as illustrated in FIG. 1 it means that Y coordinate of the ground equals to that of the character.

Now, way of calculating movement velocity and coordinate when the character jumps from an elevated height (that is, Y coordinate value is high) to lower place will be introduced.

Coordinate calculation means 120 renews the character's coordinate by calculating falling speed of the character based on predetermined algorithm when user input command via input mean 110 to let the character jump to lower place while the character lies in an elevated height such as top of building or hill. Then coordinate calculation means 120 calculates amended falling speed and the character's forward direction moving speed when the user controls the character to move forward by input predetermined command with input means 110 while the character falls freely and does not reaches the ground yet. So, coordinate calculation means 120 can renew the character's coordinate again. The character's motion of opening glider and flying over air current during free fall in game can be shown on monitor 200 as an animated motion picture.

Detailed procedure in order to implement the motion is as follow:

Coordinate calculation means 120 calculates the character's coordinate of the game's coordinate system based on Formula 1 shown below when command to force the character to fall freely from an elevated height (hereinafter referred as "fall command".) at the moment of that the character lies on an elevated height of the game's coordinate system.

$$vf = vf0 + (g*t)$$ [Formula 1]

(vf: movement velocity in Y axis, vf0: initial movement velocity in Y axis, g: acceleration of gravity, t: time increment)

Formula 1 is for calculating free fall speed. vf means free fall speed and changing speed of Y coordinate of the character at the same time. vf0 means initial speed in Y axis at the moment the character starts to fall. g means acceleration of gravity. vf0 is a constant and g also is, and they can have proper value.

t means time increment after "fall command" inputted.

By this, varying Y coordinate of the character can be calculated. Display means 130 shows animated motion picture of the character's free fall on monitor 200 using the calculated Y coordinate.

What is explained above is the procedure in case of "fall command" inputted while the character's Y coordinate is bigger than a certain value. So, the procedure may not the same if the character's Y coordinate is not bigger than a certain value. For example, if "fall command" is inputted while the character lies on the ground as illustrated in FIG. 1, there is nowhere to fall so the character will do nothing or do another motion but fall.

In the mean time, if a command to force the character move forward (hereinafter referred as "gliding command".) is inputted during the character's free fall (that is, before the character reaches the ground), coordinate calculation means 120 calculates the character's coordinate based on Formula 2 shown below.

$$v = v0 + (ks*[kd*vf]*t)$$ [Formula 2]

(v: movement velocity in X axis, initial movement velocity in X axis, kd: damping factor, ks: conversion coefficient, vf: movement velocity in Y axis, t: time increment)

In case of "gliding command", the character stops free fall then moves forward in game. Formula 2 is for calculating movement velocity of X axis of the character.

v0 means initial speed in X axis at the moment the character starts to fall. kd is damping factor for calculating upward resistance added when the glider opened. ks is a conversion coefficient from upward (Y axis) resistance into horizontal (X axis) resistance. These constants can be set up in programming process. t is time increment after "gliding command" inputted. Therefore it is not the same as Formula 1.

In the mean time, the character will stop to fall in case "gliding command" inputted during free fall before the character reaches the ground. That is, the absolute value of movement velocity in Y axis decreases as "gliding command" inputted. Preferably, decreasing movement velocity in Y axis coincide with increasing movement velocity in X axis by letting the absolute value of movement velocity in Y axis be in inverse proportion to the absolute value of movement velocity in X axis.

But, in such certain assumption that the character falls in a constant velocity, value of vf after "gliding command" cab be substituted by a constant value in spite of Formula 1.

Free fall velocity increase as time goes after the character starts to fall according to Formula 1, and forward movement speed v will be higher as free fall velocity vf increases according to Formula 2.

On the contrary, vf may not be such a high value at the moment of free fall started, and forward movement speed v will be lower as lower free fall velocity. But, altitude (Y coordinate of the character) will be lower as time progresses after free fall started.

So, it is not clear which forward movement distance is longer. It depends on diverse variables of every single case. At this moment, forward movement distance means movement distance in X axis the character moves in coordinate system of the game.

Figure 3:
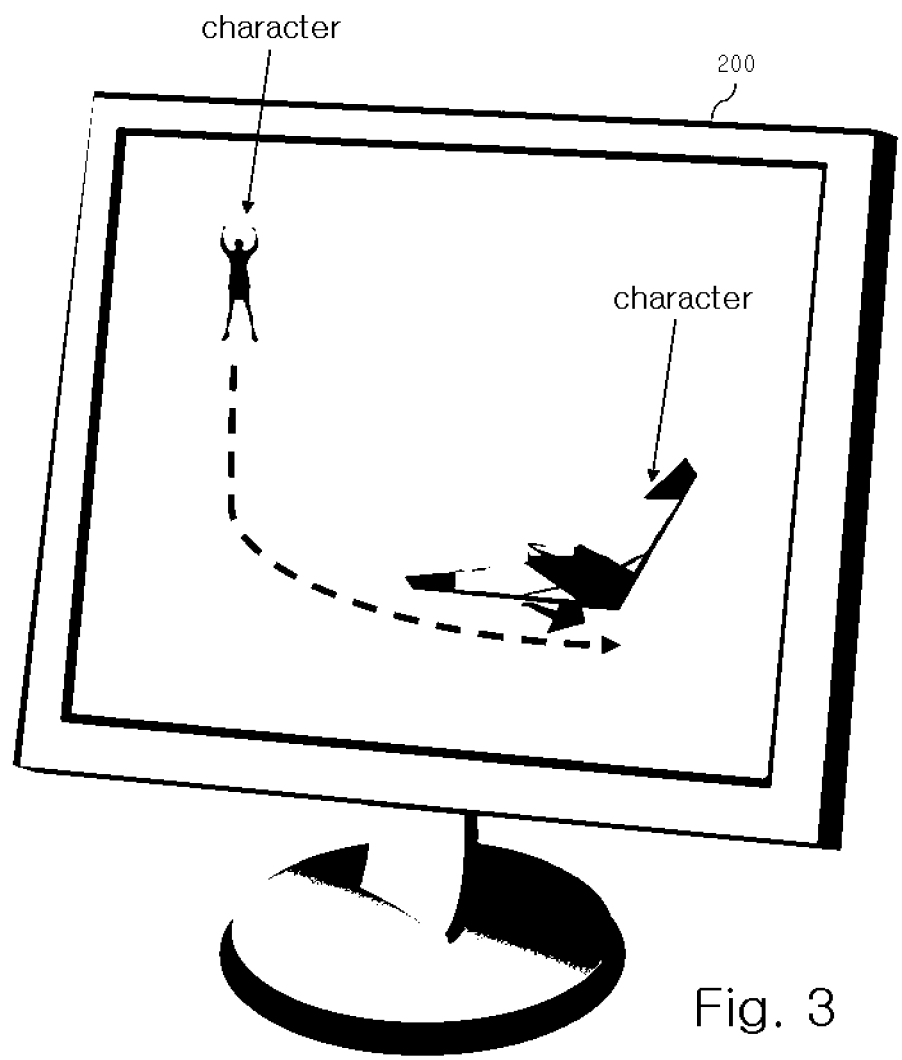
FIG. 3 illustrates concept image of game screen with game character's movement.

A free-falling character is shown in left side of FIG. 3 while forward moving character with glider opened is shown in right side. Dotted line means movement direction of the character.

A character's movement of free fall and flying forward with opened glider can be implemented in game according to the explanation stated above.

In the meantime, the character flying forward with glider opened after "gliding command" inputted may be affected by ascending air current. It is preferable because this helps garners feel interesting and the character's motion not be too simple.

In order to implement this feature, coordinate calculation means 130 raise Y coordinate of the character as the character changes moving direction in Y axis and then moves to some degree in Y axis. Coordinate calculation means 130 then recalculate movement velocity in both X and Y axis in view of Formula 1 and 2.

The character's upward movement by ascending air current may occur in a second, the character's movement velocity in X axis can be calculated with Formula 3.

$$v = v0 - (ks * [kd * vf] * t)$$ [Formula 2]

(v: movement velocity in X axis, v0: initial movement velocity in X axis, kd: damping factor, ks: conversion coefficient, vf: movement velocity in Y axis, t: time increment)

Plus sign "+" after v0 is substituted by minus sign "−" in comparison to Formula 2.

Therefore, movement velocity in X axis of the character becomes low but altitude becomes high. Thus, overall movement distance becomes longer.

This kind of ascending air current may occur randomly during the character's flying forward or may occur just before the character's landing.

In the meantime, during the character's flying forward by "gliding command", user can input another predetermined command (hereinafter referred as "fast advance command".) in order for the character to avoid ascending air current and to fly fast.

If user input "fast advance command" during the character's flying forward by "gliding command" in order for the character to avoid ascending air current and to fly fast, coordinate calculation means 120 calculates the character's movement velocity with Formulas 1 and 2. In this calculation process Y coordinate of the character never become higher. By this, the character can avoid ascending air current and land swiftly.

In the meantime, it is possible to increase falling speed in Y axis or movement velocity of X axis by adding a certain constant or multiplying by a certain constant.

By controlling the character's movement as stated above, the character's movement after during the character's free fall and degree of freedom of the character's movement control may be quite restricted. User may feel interesting while trying to make overall fly distance longer. In order to restrict degree of freedom of movement control, some commands inputted after "fall command" and "gliding command" can be omitted.

For example, even if user inputs "↑" or "↓" key from keyboard during the character's flying forward by "gliding command", process according to the inputted key—to move the character upward or downward etc.—will not be executed.

In the meantime, users may have fun with controlling his character and may be familiar with the game easily if key input scheme be simplified. In order to provide simple input scheme "space bar" inputted when the character's altitude is higher than a predetermined value can be regarded as "fall command", the same "space bar" inputted during the character's free fall can be regarded as "gliding command".

Figure 4:
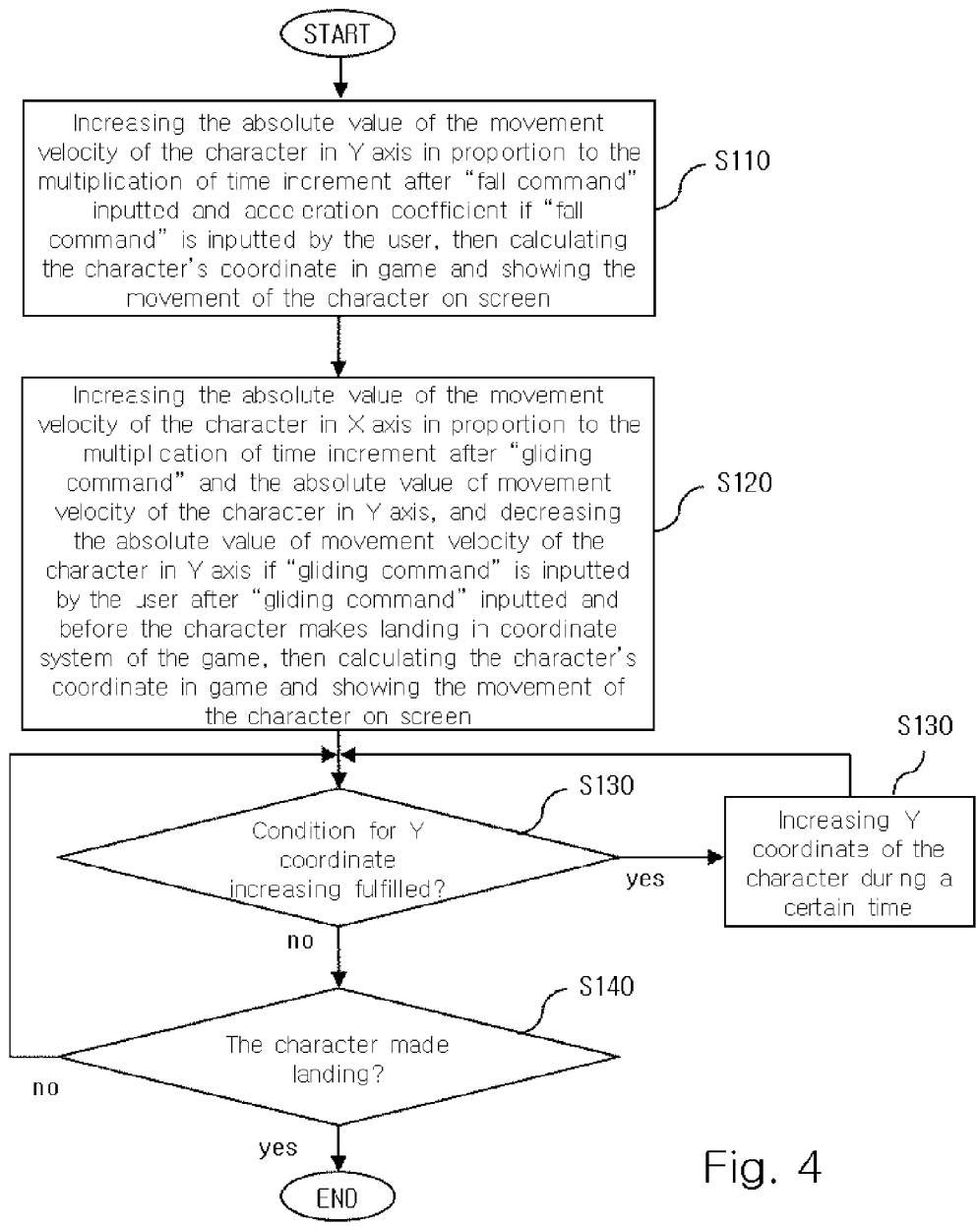
FIG. 4 illustrates flow chart that represents the method of controlling game character's movement according to the present invention.

Hereinafter, the method of calculating the character's coordinate and processing animation on screen by the apparatus of controlling game character's movement according to the present invention will be described with reference to FIG. 4.

The same explanation with the above stated explanation will be skipped.

At first, if user inputs from keyboard 110 the apparatus of controlling game character's movement recognize the value of the input. If input value equals "fall command" to let the character fall in game, the apparatus increases the absolute value of the character's movement velocity in Y axis in proportion to the time increment after "fall command" inputted multiplied by acceleration coefficient. Then, the apparatus calculates the character's coordinate in game and processes animation of the character's movement in screen. (step 110).

By this, animation process of the character's free fall from an elevated height (a position with high Y coordinate in coordinate system of the game) such as hill can be implemented.

If user inputs "gliding command" after that, the apparatus increases the absolute value of movement velocity in X axis in proportion to the time increment after "gliding command" multiplied by the absolute value of movement velocity of Y axis, and the apparatus decreases the absolute value of movement velocity in Y axis. Thus, the apparatus calculates the character's coordinate and then shows the motion of the character in screen. (step 120).

Display control means 130 may process the character's motion as an animation that the character opens glider just as what is illustrated in FIG. 3. In FIG. 3, a character opens glider and flies forward during free fall.

In the meantime, movement velocity in Y axis is no longer free fall when the character flies forward with glider opened and becomes uniform motion. That is, movement velocity in Y axis equals to a certain constant. Or, movement velocity in Y axis becomes in inverse proportion to movement velocity in X axis.

After that, the apparatus can increase Y coordinate of the character in coordinate system randomly before the character make landing. It can be executed when the ascending air current occurs. Ascending air current can occur randomly or occur just before the character's landing. By the ascending air current falling speed of the character decreases and the character may ascend in a certain distance. Movement velocity in X axis of the character may decrease in this moment. This makes the game more realistic.

When the ascending air current disappears, that is, when the rise of Y coordinate ends, the apparatus calculates movement velocity in X axis and Y axis again, and coordinate of the character again. (step 130)

The apparatus repeats from S110 top S130 before the character make landing in game, and ends the process after the character's landing. (step 140)

Although several exemplary embodiments of the present invention have been described for illustrative purposes, the present invention is not limited to these embodiments. Those skilled in the art will appreciate that various modifications, additions and substitutions are possible, without departing from the scope and spirit of the invention as disclosed in the accompanying claims.

What is claimed is:

1. A method of controlling and displaying a movement of a game character on a screen of a computer, comprising:
   (a) causing a processor to increase an absolute value of a movement velocity of a character in Y axis in proportion to a value obtained by multiplying a first time increment after a fall command is inputted by an acceleration coefficient when a fall command is inputted by a user, then causing the processor to calculate the coordinate of the character in a game and showing the movement of the character on a screen; and
   (b) increasing an absolute value of a movement velocity of the character in X axis in proportion to a value obtained by multiplying a second time increment after a gliding command is inputted by the absolute value of movement velocity of the character in Y axis, and decreasing the absolute value of movement velocity of the character in Y axis after the gliding command is inputted and before the character's landing in the coordinate system of the game, then calculating the coordinate of the character in the game and showing the movement of the character on the screen.

2. The method of claim 1, wherein the step of decreasing the absolute value of the movement velocity in Y axis in step (b) includes setting the absolute value of the movement velocity in Y axis in inverse proportion to the absolute value of the movement velocity in X axis.

3. The method of claim 1, further comprising, after step (b):
   (c) randomly increasing a Y coordinate value of the character during a certain time period before the character makes landing in the game, and then re-calculating the movement velocities of the character in X and Y axes.

4. The method of claim 1, further comprising, after step (b):
   (d) increasing a Y coordinate value of the character during a certain time period, and then re-calculating the movement velocities of the character in X and Y axes when a distance between the character and a ground in the game is shorter than a preset value.

5. The method of claim 1, wherein step (b) includes setting X coordinate and Y coordinate values of the character in the game while keeping the Y coordinate values of the character from being raised before the character's landing when the fall command and the gliding command are inputted in a consecutive order and then a fast forward command is inputted by the user.

6. The method of claim 1, further comprising:
   (e) ending a process if a Y coordinate value of the character is equal to a Y coordinate value of a ground in the coordinate system of the game, otherwise jumping to step (a).

7. A non-transitory computer readable recording medium carrying one or more sequences of pattern data for controlling a movement of a game character in a computer, wherein execution of one or more sequences of pattern data by one or more processors causes the one or more processors to perform the steps of:
   increasing an absolute value of a movement velocity of a character in Y axis in proportion to a value obtained by multiplying a first time increment after a fall command is inputted by an acceleration coefficient when a fall command is inputted by a user, then calculating the coordinate of the character in a game and showing the movement of the character on a screen; and
   increasing an absolute value of a movement velocity of the character in X axis in proportion to a value obtained by multiplying a second time increment after a gliding command is inputted by the absolute value of movement velocity of the character in Y axis, and decreasing the absolute value of movement velocity of the character in Y axis after the gliding command is inputted and before the character's landing in the coordinate system of the game, then calculating the coordinate of the character in the game and showing the movement of the character on the screen.

8. The non-transitory readable medium of claim 7, wherein the execution of one or more sequence of pattern data by one or more processors causes the one or more processors to perform the additional step of:
   randomly increasing a Y coordinate value of the character during a certain time period before the character makes landing in the game, and then re-calculating the movement velocities of the character in X and Y axes.

9. The non-transitory readable medium of claim 7, wherein the execution of one or more sequence of pattern data by one or more processors causes the one or more processors to perform the additional step of:
   increasing a Y coordinate value of the character during a certain time period, and then re-calculating the movement velocities of the character in X and Y axes when a distance between the character and a ground in the game is shorter than a preset value.

10. An apparatus for controlling a game character's movement, comprising:
    an input means for receiving an input from a user, the input including a fall command and a gliding command;
    a coordinate calculation means for calculating a coordinate of a character in a coordinate system of a game during a play of the game, increasing an absolute value of a movement velocity of the character in Y axis in proportion to a value obtained by multiplying a first time increment after the fall command is inputted by an acceleration coefficient, increasing an absolute value of a movement velocity of the character in X axis in proportion to a value obtained by multiplying a second time increment after a gliding command is inputted by the absolute value of the movement velocity of the character in Y axis, and decreasing the absolute value of the movement velocity of the character in Y axis after the gliding command is inputted and before the character's landing in the coordinate system; and
    a display control means for showing the character on a screen by using the calculated coordinate of the character in the game.

11. The apparatus of claim 10, wherein the coordinate calculation means is for calculating the movement velocity of the character in Y axis in the coordinate system of the game and then calculating the coordinate of the character, when the fall command is inputted by the user, according to an equation:

$$vf=vf0+(g*t),$$

where vf is the movement velocity of the character in Y axis, vf0 is an initial movement velocity in Y axis, g is an acceleration of a free falling, and t is a time increment.

12. The apparatus of claim 10, wherein the coordinate calculation means is for calculating the movement velocity of the character in X axis in the coordinate system of the game and then calculating the coordinate of the character, when the fall command and the gliding command are inputted by the user in a consecutive order, according to an equation:

$$v=v0+(ks*[kd*vf]*t),$$

where v is the movement velocity of the character in X axis, v0 is an initial movement velocity in X axis, kd is a damping coefficient, vf is a movement velocity in Y axis, and t is a time increment.

13. The apparatus of claim 12, wherein the coordinate calculation means is for setting the movement velocity of the character in Y axis in the coordinate system of the game in proportion to the movement velocity of the character in X axis, then calculating the coordinate of the character in the game.

14. The apparatus of claim 10, wherein the coordinate calculation means is for randomly increasing a Y coordinate value of the character during a certain time period before the character makes landing in the game, and then re-calculating the movement velocities of the character in X axis and Y axis.

15. The apparatus of claim 14, wherein the coordinate calculation means is for calculating the movement velocity of the character in X axis during the certain time period, and then calculating the coordinate of the character in the game according to an equation:

$$v=v0-(ks*[kd*vf]*t),$$

where v is the movement velocity of the character in X axis, v0 is an initial movement velocity in X axis, kd is a damping coefficient, ks is a conversion coefficient, vf is the movement velocity in Y axis, and t is a time increment.

16. The apparatus of claim 10, wherein the coordinate calculation means is for increasing a Y coordinate value of the character during a certain time period, and then recalculating the movement velocities of the character in X axis and Y axis when a distance between the character and a ground in the game is shorter than a preset value.

17. The apparatus of claim 16, wherein the coordinate calculation means is for calculating the movement velocity of the character in X axis during the certain time period, and then calculating the coordinate of the character in the game according to an equation:

$$v=v0-(ks*[kd*vf]*t),$$

where v is the movement velocity of the character in X axis, v0 is an initial movement velocity in X axis, kd is a damping coefficient, ks is a conversion coefficient, vf is the movement velocity of the character in Y axis, and t is a time increment.

18. The apparatus of claim 10, wherein the coordinate calculation means is for setting X and Y coordinate values of the character in the game by keeping the Y coordinate value of the character from being raised before the character's landing when the fall command and the gliding command are inputted in a consecutive order and then a fast forward command is inputted by the user.

19. The apparatus of claim 10, wherein the input means further comprises a keyboard, and the fall command is inputted by pressing a space bar of the keyboard, and the gliding command is inputted by pressing the space bar of the keyboard again after the fall command is inputted and before the character makes landing in the coordinate system of the game.

20. The apparatus of claim 10, wherein the coordinate calculation means is for ignoring a command for controlling the character's movement inputted through the input means after the fall command and the gliding command are inputted in a consecutive order and before the character makes landing in the coordinate system of the game.

* * * * *